July 14, 1931.                H. JAMES                1,814,754
                           ELECTRIC COOKER
                         Filed Nov. 5, 1928
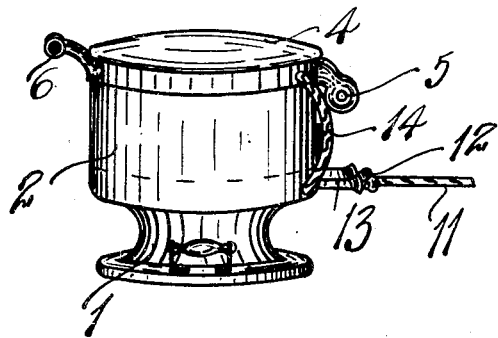
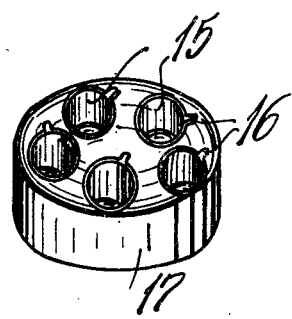
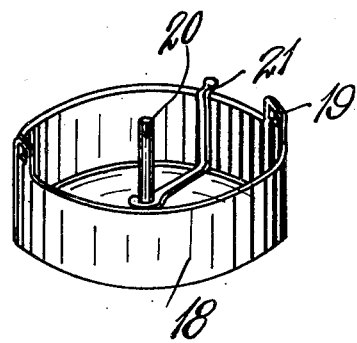
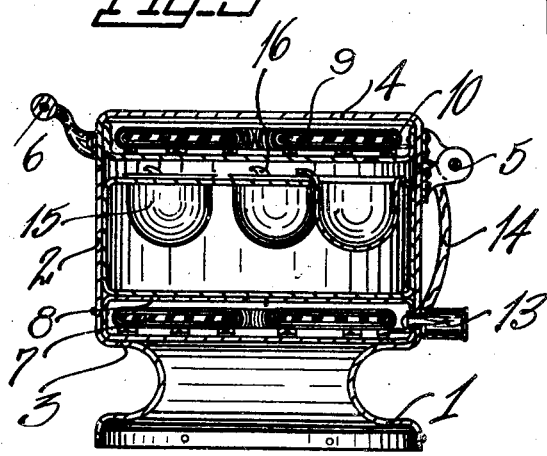
Inventor
Hettie James
By Herbert E. Smith
Attorney Patented July 14, 1931

1,814,754

UNITED STATES PATENT OFFICE

HETTIE JAMES, OF SEATTLE, WASHINGTON

ELECTRIC COOKER

Application filed November 5, 1928. Serial No. 317,158.

My present invention relates to an improved electric cooker of the portable type, and adapted for use in various ways but especially designed for frying, poaching, and otherwise cooking, foods of different characters.

The primary object of my invention is the provision of a utensil of this character that is compact in arrangement, portable, simple in construction and with its parts readily accessible for adjustment and use, and with the electric heating elements arranged for efficient performance of the functions of the cooker. In carrying out my invention the cooker is designed to accommodate various cooking utensils, two of which are illustrated, but it will be understood that the set of utensils for the cooker may contain other devices for other purposes than those illustrated.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

Figure 1 is a perspective view of the electric cooker embodying my invention. Figures 2 and 3 are perspective views of different utensils used in the cooker. Figure 4 is a sectional detail view of the cooker with the poaching utensil of Figure 3 therein.

In carrying out my invention I employ a portable cooker of convenient size and shape and of appropriate material, and as here shown with a base 1 and cylindrical body 2, the body or casing 2 being fashioned with an annular lower flange 3. The round or circular top 4 of the casing is hinged thereto at 5, and a handle 6 is provided for the top or lid 4 for convenience in manipulating the cooker. In the lower portion of the body or casing of the cooker an electric heating element 7 with its housing 8 is supported on the annular flange 3, and the top face of the housing provides a supporting plate for the utensils that are to be enclosed in the casing.

In the hinged lid an upper heating element 9, with its housing 10, is supported, the parts being insulated against loss of heat by radiation, and also insulated in suitable manner against loss of electrical energy. Between the lower heating element and the upper heating element a heating chamber is formed within the casing 2, and access to this chamber is provided by opening the hinged lid that contains the upper heating element. When closed, the lid provides a closed heating chamber to which the heat is furnished from both the upper and lower heating elements, or from either of these elements.

The usual electric wires 11 from a suitable source, as the house current, are connected by a connector 12 to the standard type of socket 13, which socket is directly connected with the lower heating element, and a flexible connection 14 is provided therefrom to the upper heating element, the flexible connection entering the heating element adjacent the hinge 5 in order to permit freedom of movement of the hinged lid without interfering with the electrical connection to its heating element.

The heating chamber is adapted to receive, selectively, various utensils that may be included in a set, specially constructed for the purpose, but other cooking utensils may be used in the heating chamber. For poaching eggs by the cooker, I preferably employ a number of metal cups 15 having handles 16, and these cups are seated in holes in the top of a pan 17. The pan is of cylindrical shape and, adapted to rest on the top plate of the housing of the lower heating element within the casing 2. The cups are filled or partially filled with water, and the eggs to be poached are broken and dropped into the water in the cups, the lid is closed, and the upper heating element is operated, or both heating elements may be operated to provide the necessary heat within the heating chamber for poaching the eggs.

In Figure 2 a pan 18, similar to a cake-baking pan is illustrated that may be used for cooking an omelet in the cooker. This pan, which is fashioned with handles 19, is also of cylindrical shape, and is provided with a central tube 20, which, tube, when the pan is placed on the housing of the lower heating element, conveys heated air currents to the space in the chamber above the pan. This tube or tubular post also forms a guide and support for the angular arm 21 that extends across the bottom of the pan 18 and is accessible at the edge of the pan for turning, to free the omelet from the bottom of the pan after it is "done".

Other utensils may be employed in the heating chamber, and numerous other cooking processes may be carried out in the heating chamber, it being understood that appropriate means are provided in the upper plate of the housing 8 and the lower plate of housing 10 for radiation of the heat from their respective elements to the chamber.

Having thus fully described my invention, what I claim as new and desire to secure by Letters Patent is:—

1. In an electric cooker the combination with a vessel receiving casing having a base and an annular flange, a removable housing supported on the flange and a heating element in said housing, of a hinged lid for the casing, a removable housing supported in the lid and a heating element in said housing, electrical connections to the first element, and flexible electrical connections from the first element to the second element.

2. An electric cooker consisting of a utensil receiving compartment; a supporting base for the same; said compartment and base formed of a single piece of metal; an annular ledge formed by pressing the side wall inwardly between the utensil compartment and the base; a housing supported on the ledge and an electric heating element in said housing; a hinged cover for said utensil compartment; a housing secured in said cover, and an electric heating element in said housing; both of said elements disposed in horizontal planes when in the position of use; electrical connections to the first element, and flexible electrical connections from the first element to the second element.

In testimony whereof I affix my signature.

HETTIE JAMES.